United States Patent [19]

Pechenik et al.

[11] Patent Number: 5,147,446
[45] Date of Patent: Sep. 15, 1992

[54] METHOD FOR FABRICATION OF DENSE COMPACTS FROM NANO-SIZED PARTICLES USING HIGH PRESSURES AND CRYOGENIC TEMPERATURES

[75] Inventors: Alexander Pechenik, Rockville, Md.; Gasper J. Piermarini, McLean, Va.

[73] Assignee: The United States of America as represented by the Secretary of the Commerce, Washington, D.C.

[21] Appl. No.: 740,889

[22] Filed: Aug. 6, 1991

[51] Int. Cl.$^5$ ............................................. C22C 29/00
[52] U.S. Cl. ........................................ 75/230; 264/56; 264/65; 264/66; 264/109; 264/125; 419/10; 419/23; 419/25; 419/39; 419/48
[58] Field of Search ................. 264/56, 65, 66, 109, 264/125; 419/10, 23, 25, 39, 48; 75/230

[56] References Cited

U.S. PATENT DOCUMENTS

| | | | |
|---|---|---|---|
| 4,744,943 | 5/1988 | Timm | 419/10 |
| 4,771,022 | 9/1988 | Block et al. | 501/103 |
| 4,883,779 | 11/1989 | McAllister et al. | 264/56 |
| 4,921,666 | 5/1990 | Ishii | 419/25 |
| 4,970,049 | 11/1990 | Baker et al. | 419/38 |

Primary Examiner—Stephen J. Lechert, Jr.
Attorney, Agent, or Firm—James A. Oliff; Fran S. Wasserman

[57] ABSTRACT

A method of producing a dense compact of ultra-fine powder employs low temperatures and high pressures to produce a very dense, nearly ideally packed compact from a starting nano-sized powder. The final product is capable of being easily hot-pressed or sintered to full density.

19 Claims, No Drawings

METHOD FOR FABRICATION OF DENSE COMPACTS FROM NANO-SIZED PARTICLES USING HIGH PRESSURES AND CRYOGENIC TEMPERATURES

The present invention is generally directed to dense compacts of ultra-fine powders, and specifically to a method of producing a dense compact of ultra-fine powder of ceramics, metals and mixtures thereof from nano-sized particles.

BACKGROUND OF INVENTION

Currently, there are no successful techniques for fabrication of materials from ultra-fine powders. Ultra-fine powders are composed of particles ranging in size from 1.0 to 50 nm. Such small particles are called "nano-sized". Particles this small possess unique mechanical and physical properties which can be utilized in materials manufactured from such small particles. To preserve the unique properties of nano-sized particles in the bulk material, it is imperative not to increase the size of the particles during fabrication. The goal is to fabricate "nano-grain" material starting from the nano-sized particles without changing the size of the individual particles.

Unfortunately, nano-sized particles have inherent properties which make it very difficult to fabricate industrial parts from them. Small particles exhibit strong inter-particle cohesive forces and thus tend to agglomerate easily. When such particles are subjected to compacting, this agglomerating tendency causes large voids (much larger than the size of the particles) to be created between the particles. The large voids lead to the production of low density compacts, usually 20–40% of theoretical density. Such low-density compacts are very difficult to sinter or hot-press to 100% of theoretical density without using high temperatures. High temperatures invariably lead to rapid non-uniform sintering and coalescence of nano-sized grains causing grain growth and, consequently, loss of desired properties.

In most applications, it is desirable for a material to achieve 100% or full density because this state provides the best properties, both mechanical and physical. Full density in a material can be achieved either by application of high temperature or high pressure. Because high temperatures are undesirable for fabrication of nano-grain materials starting from nano-sized powders for the reasons given above, high pressures have been increasingly utilized in various attempts to fabricate full density nano-grain materials.

U.S. Pat. No. 4,771,022 to Block et al. discloses a high pressure process for transforming a powder material having an average particle size of at most about 1 micron (1000 nm) to a denser, high pressure polymorph. The high pressure process can be done at room temperature or at elevated temperature, depending on the material. The process comprises the steps of preparing a stable phase powder of particles wherein the average particle size is at most about 1 micron, applying pressure to the stable phase powder to convert the powder to a mixture of metastable-stable polymorphs, sintering the mixture at a relatively low sintering temperature (i.e., at most 500° C.), and depressurizing and cooling the mixture.

U.S. Pat. No. 4,744,943 to Timm discloses a process for preparing dense consolidated powders. The powders may include ceramics and metals which can be pure or substantially pure. The densification process is done at temperatures of 400° to 2900° C. and at pressures of 10,000 to 500,000 psi, depending on the materials used.

U.S. Pat. No. 4,921,666 to Ishii discloses a hot isostatic pressing process for sintering or densifying a ceramic material. The process comprises the steps of preheating the material prior to the hot isostatic pressing treatment, transferring the material into a high pressure vessel, treating the material at a high temperature of from 1200° C. to 2000° C. and a high pressure of at least 500 atm, and cooling the material.

Karch, Birringer, and Gleiter in Germany, and also Siegel et al from Argonne National Lab, U.S.A., published a new method for fabricating nano-grain materials from nano-sized particles of $TiO_2$, $CaF_2$, $CuFe$ and other materials. Their technique involved compacting these powders under pressure of 1–5 GPa at room temperature.

All of the above methods employ temperatures ranging from room temperature to about 2900° C. Compacting at room temperature produced voids in the compacts, whereas higher temperatures used in the above methods led to rapid non-uniform sintering and grain growth of nano-sized grains. This made it impossible to produce 100%-dense nano-grain materials from nano-sized particles using these techniques.

SUMMARY OF INVENTION

It is an object of the invention to provide a method of fabricating dense, nearly ideally packed compacts of nano-sized particles.

It is a further object of the invention to provide ceramic and/or metallic materials which are in the state of ideally-compacted nano-sized particulates and capable of being sintered or forged to full density at much lower temperatures than are normally required for densification of conventional powder compacts.

These and other objects are achieved by the present invention which provides for compacts of nano-sized particles to be prepared from powders of said particles by a procedure employing low temperatures and high pressures and whereby the ideally packed compact so formed is capable of subsequently being sintered to a high density.

DETAILED DESCRIPTION OF PREFERRED EMBODIMENTS

The present invention provides a compact of ultra-fine powder by a procedure utilizing low temperatures and high pressures to produce a very dense, nearly ideally packed compact from a starting nano-sized powder, and a method for producing the very dense compact which is capable of being subsequently sintered or hot-pressed to full density. The present invention is particularly useful for preparing nano-grain materials for structural, electronic, and optical applications, including producing parts for ceramic engines, cutting tools, hard coatings, wear-resistant and corrosion resistant surfaces, optical transmitters (in the ultraviolet-visible-infrared wavelengths) with excellent mechanical and high temperature properties, electronic substrates, components for microelectronics, and optical sensors.

It has been found that lowering the temperature of the ultra-fine powders during compaction produces improvements in the compacting properties. More preferably, when the powders are in pure nitrogen atmosphere, lowering the temperature to that of liquid nitrogen (i.e., 77° K.) produces significant improvements in these compacting properties. These improvements are believed to be due to two major factors: 1) condensation of a thin layer of liquid gas on the surface of the individual particles, and 2) decrease in the rate of bridge-formation between particles in close contact, because of decreasing diffusion rates with lowering temperature. Both factors decrease the frictional force between the individual particles, which in turn leads to improved flow of particles under applied pressure and to better compaction. For optimal results pressure has to be applied with a predetermined rate consistent with the rheological properties of the powder. The observed improvements in compacting properties of ultra-fine powders are believed to be of general nature, common to all ultra-fine powders of nano-sized particles.

Particles of ultra-fine powder useful for this invention range in diameter size from 1.0 to 50 nm. The ceramic material employed in the process of the present invention is a nano-sized particulate material. In general, any ceramic material can be used with this process. Examples of ceramic materials include oxides, carbides, nitrides, phosphides, silicides, borides, sulfides and mixtures thereof. Examples of preferred ceramic materials include alumina, zirconia, magnesia, mullite, zircon, thoria, beryllia, urania, spinels, tungsten carbide, tantalum carbide, titanium carbide, niobium carbide, zirconium carbide, boron carbide, hafnium carbide, silicon carbide, niobium boron carbide, aluminum nitride, titanium nitride, zirconium nitride, tantalum nitride, hafnium nitride, niobium nitride, boron nitride, silicon nitride, titanium boride, chromium boride, zirconium boride tantalum boride, molybdenum boride, tungsten boride, cerium sulfide, molybdenum sulfide, cadmium sulfide, zinc sulfide, titanium sulfide, magnesium sulfide, zirconium sulfide and mixtures thereof. A more preferred ceramic material is silicon nitride which may be used in any of the following polymorphs: alpha, beta, or amorphous.

Metallic materials which can be used alone or with the ceramic material in this invention include metals, alloys and mixtures thereof. Examples of typical metals materials include cobalt, nickel, iron, tungsten, rhenium, steel, stainless steel, superalloys, molybdenum, tantalum, titanium, chromium, niobium, boron, zirconium, vanadium, palladium, hafnium, aluminum, copper, alloys thereof and mixtures thereof.

In the process of the present invention, a starting ultra-fine powder comprising nano-sized particles is used. The nano-sized particles can be fabricated by any of the large variety of techniques employed in the art of nano-sized particle fabrication. These techniques include, for example: laser-assisted gas reactions, microwave assisted gas reactions, sol-gel synthesis, evaporation-condensation, organometallic reactions, etc. The preferred starting powders are produced by a laser-assisted synthesis technique.

In this invention, the starting powder is first pre-compacted at room temperature, in air, in a piston-cylinder WC/Co die by pressure ranging from 0.1 to 1 GPa. The exact method of pre-compaction is not important. A variety of methods is used by those skilled in the art of powder processing. Similar effects can be achieved by spray-drying, for example. The pre-compaction step produces a compact with a density of approximately 20–40% of full density. In the case when the starting powder requires handling under inert atmosphere, such as, for example, nitrogen or argon, then the pre-compacting step is carried out under the protective atmosphere. The preferred arrangement depends on the type of powder and properties desired after fabrication; for silicon nitride the preferred atmosphere is dry nitrogen, whereas oxides can be processed in air.

The compact is next crushed to 50–100 μm pieces which are then charged into the diamond anvil pressure cell. In this invention, a diamond anvil pressure cell is preferably used, because it is capable of generating a wide range of pressures, from 0.1 to 50 GPa, at temperatures from essentially 0 to 873° K. or higher. In an industrial production environment, any pressing equipment capable of generating pressures near 5 GPa at temperatures near 77° K. can be used with this invention.

Next, the diamond cell containing the pre-compacted powder is sealed by applying compacting pressure of 0.5 to 1 GPa to the diamond anvil. This step isolates the powder being processed from the surrounding atmosphere. The diamond anvil cell containing the sealed powder is then cooled below room temperature. Preferably the temperature is lowered to about 77° K. At this temperature gas sealed inside of the diamond cell with the pre-compacted powder condenses on the nano-sized particles and forms a protective layer around each particle which allows the particles to slide past each other under the influence of the applied pressure.

The pressure is increased to 1–5 GPa, and preferably 2–5 GPa. The pressure is increased under a specified rate which depends on the ability of the powder to flow at the pressing temperature. The range of rates of pressure application is from 0.01 to 10 GPa per minute. The preferred rate is 1 GPa per minute. After the maximum selected pressure is reached, the pressure is held for a period of time of from 1 second to 100 hours, preferably from 0.1 to 1 hour. This procedure leads to forming an ideally-packed compact of nano-sized particles with a density from about 60 to 100% of full density. The density of a compact after cryogenic compaction depends on the ability of the individual particles to deform under the applied pressure and on the size-distribution of the nano-sized particles in the ultra-fine powder. The highest density of packing of mono-sized spheres without deformation of the spheres is 74% of theoretical density. These notions are familiar to those skilled in the art of powder pressing. The essential aspect of the cryogenic compaction step is not the achievement of 100% density of the compact, but the achievement of ideal packing of the nano-sized particles.

After completion of the above compacting step, and depending on the material and applications projected for the compact, the compacted powder may undergo a finishing step, if needed, whereby the dense compact is subjected to hot pressing and/or sintering to optimize the microstructure and properties for desired applications. The compact, while still under pressure in the diamond cell, may be heated to a temperature of from 20–600° C. for a period of from 0.1 to 100 hours. Alternatively, or additionally, the compact may be removed from the cell and sintered in a controlled atmosphere furnace, wherein the compact is heated to a temperature of from 1000–1500° C. for a period of from 0.1 to 100 hours. The ideal packing of nano-sized particles in the compact produced by the cryogenic compaction method described above makes it possible to sinter ceramic materials to 100% density at much lower temperatures than conventionally possible. This allows avoidance of grain growth and retention of desired properties of nano-sized particles in the fully dense state of nano-grain material.

Ceramic materials produced via cryogenic processing are usually transparent with hardness improved by 10–30%; both effects are due to the nano-grain nature and full density of the materials. For example, it has been found that amorphous silicon nitride prepared using the cryogenic compaction is optically transparent and has hardness of 1200 kg/mm$^2$, whereas the same material fabricated using room temperature compaction has hardness of 700 kg/mm$^2$ and is translucent (see examples 1 and 2). The optical absorption coefficient for amorphous silicon nitride pressed at 77° K. is 0.1 mm$^{-1}$, whereas for the room temperature counterpart is 20.0 mm$^{-1}$.

In a preferred embodiment wherein silicon nitride is formed by this process, the starting powders used may be amorphous, with the particle size in the range of from 1.0 to 50 nm, may be stoichiometric or non-stoichiometric, and have a narrow size distribution. The stoichiometric form is preferred when optical properties are optimized, whereas the non-stoichiometric form may lead to improved high-temperature properties (see Example 3).

Prior to commencing the process of this invention, the starting powder used to prepare the amorphous silicon nitride material may be maintained under inert conditions (nitrogen, argon gas), or it may be exposed to the air. The preferred arrangement is nitrogen atmosphere. In an initial pre-compacting step, the starting powder is charged in a WC/Co die, and pressure is applied in an amount ranging from 0.1 to 1.0 GPa, while the temperature of the die is maintained at room temperature. The pressure is applied for approximately 30 seconds. The produced pellet has density between about 20 and 40% of full density.

The pellet is crushed into small pieces 50–100 μm in size, which are then charged into a diamond anvil pressure cell. The cell is sealed under 1 GPa of pressure and then cooled to a temperature below room temperature. The preferred temperature for compacting the powder is 77° K. Such temperatures can be obtained using liquid nitrogen. Pressure from 1 to 5 GPa is applied to the sample while at the cooled temperature. Preferably, pressure of 5 GPa is applied for a period ranging from 0.1 to 0.5 hours.

After completion of the above compaction step the compact undergoes a processing step, whereby the dense compact is subjected to hot-pressing to optimize the properties for desired applications. The compact, while still under pressure in the diamond cell, is heated to a temperature from 500–600° C. for a period from 0.1 to 100 hours. Preferably the compact is heated to 500–600° C. for 1–3 hours under pressure of 2–5 GPa. This step produces transparent silicon nitride glass with hardness in the range of 1000–1200 kg/mm$^2$. The amorphous silicon nitride material has never been prepared by conventional methods in the bulk form. It has a unique combination of properties such as high hardness, good optical transparency in the visible and infrared, and high fracture toughness, which still has not been characterized satisfactorily, because the material does not fracture in a manner similar to other ceramic materials. After the above step the material has density from 60% to 80% of theoretical, depending on pressing temperature and pressure. The microstructure of the material contains a uniformly distributed network of interconnected pores 10–30 nm in diameter.

When it is desired to produce amorphous silicon nitride with density from 95% to 100% of theoretical, the transparent silicon nitride glass prepared in the previous step can be sintered at 1400–1500° C. In this case, the compact is removed from the diamond cell and sintered in a controlled atmosphere furnace under nitrogen, argon or in vacuum. The dense packing of nano-sized particles in the compact produced by the cryogenic compaction method described above makes it possible to sinter silicon nitride close to 100% density at 1400° C., which is a much lower temperature than required for conventional hot pressing (2000° C.). The material produced after sintering is 100% dense, has hardness of 2000 kg/mm$^2$, and high optical transparency. Depending on sintering conditions, the phase composition of the transparent silicon nitride after sintering can be a mixture of amorphous and alpha-crystalline phases with the weight percent of alpha changing between 0 and 100%.

The invention will further be illustrated in the following, non-limiting example, it being understood that this invention is not intended to be limited to the materials, conditions, process parameters and the like recited herein.

EXAMPLE 1

Ultra-fine amorphous Si$_3$N$_4$ powder wherein the particles are about 20 nm in size is pre-compacted under 0.13 GPa at room temperature to density of 25% of full density. The pre-compacted material is then crushed into small chunks 50–100 μm in size and then charged into a diamond anvil pressure cell. The cell is cooled to liquid nitrogen temperature (77° K.), and pressure of 5 GPa is applied to the sample. The sample maintained at 77° K. for 5 minutes; then the temperature is increased to 293° K. over a period of 15 minutes. After measuring the pressure and ensuring that it is 5 GPa, the temperature of the cell is increased to 773° K. and held at that temperature for 3 hours. The temperature is then returned to 293° K., the cell is depressurized, and the prepared material is examined. The material has the appearance of glass and is completely transparent in visible light. The coefficient of absorption measured with wavelength 488 nm is 0.1 mm$^{-1}$. The hardness under 1 kg load is 1200 kg/mm$^2$.

EXAMPLE 2

Another sample of silicon nitride amorphous nano-sized powder is processed in the same manner as above, except that the compression step prior to sintering is performed at room temperature instead of liquid nitrogen temperature. The hardness of the prepared sample is 700 kg/mm$^2$, and the sample is translucent. The optical absorption coefficient is 20.0 mm$^{-1}$.

The above examples clearly indicate that the compaction at liquid nitrogen temperature produces denser and harder compacts than those prepared at room temperature.

EXAMPLE 3

The sample fabricated according to the procedure described in Example 1 is sintered in a tube furnace in flowing argon. The sample is sintered at 300° C./hour to 400° C., 1 hour at 1400° C., and 300° C./hour to room temperature. Hardness of the sample after sintering is 2000 kg/mm$^2$. Such high hardness has never been achieved by sintering silicon nitride at 1400° C. without using either pressure or sintering aids. (Generally, silicon nitride is hot pressed at 2000° C. and sintering aids such as MgO or $Y_2O_3$ are used to assist densification).

EXAMPLE 4

Another sample prepared as in Example 2 is sintered at 1400° C. following the procedure outlined in Example 3. Hardness of the sample after sintering is 1200 kg/mm$^2$.

Examples 3 and 4 show that dense compacts prepared via cryogenic compaction can be sintered to high hardness (which requires high density) without using sintering aids and at much lower temperatures than those required by conventional processing procedures.

While the invention has been described with reference to particular preferred embodiments, the invention is not limited to the specific examples given, and other embodiments and modifications can be made by those skilled in the art without departing from the spirit and scope of the invention.

What is claimed is:

1. A method of producing a compact of ultra-fine powder, comprising:
   pre-compacting or agglomerating a starting powder having a particle size of from 1.0 to 50 nm into particles of 50–100 μm in size and a density of from 20 to 40% of true density;
   placing said pre-compacted powder into a pressure cell;
   lowering the temperature of said cell below room temperature (20° C.); and
   applying pressure of from 0.1 to 5 GPa to said cell while maintaining the cell at said lowered temperature, thereby forming said compact.

2. The method of claim 1, wherein the density of said compact is from 60 to 100% of full density.

3. The method of claim 1, wherein the density of said compact is from 60 to 75% of full density.

4. The method of claim 1, wherein the starting nano-sized powders are selected from the group consisting of ceramics, metals and mixtures thereof.

5. The method of claim 1, wherein the starting powder is comprised of silicon nitride.

6. The method of claim 1, wherein the temperature to which the pressure cell is lowered is 77° K.

7. The method of claim 1, wherein said cell is a diamond anvil pressure cell.

8. The method of claim 1, further comprising a hot-pressing step comprising applying pressure of from 2 to 5 GPa to said compact and raising the temperature of said compact to from 100 to 500° C.

9. The method of claim 1, further comprising a sintering step comprising raising the temperature of said compact to 1000–1500° C. until the compact has reached a density of from 90 to 100% of full density.

10. The method of claim 1, further comprising a hot-pressing step and a sintering step.

11. A dense compact formed by a process comprising:
    pre-compacting a starting powder having a particle size of from 1.0 to 50 nm to a density of from 20 to 40% of true density;
    placing said pre-compacted powder into a pressure cell;
    lowering the temperature of said cell to from 77° to 293° K.; and
    applying pressure of from 0.5 to 5 GPa to said cell while maintaining the cell at said lowered temperature, thereby forming said compact.

12. The compact of claim 11, wherein the density of said compact is from about 60 to 100% of full density.

13. The compact of claim 11, wherein said process further comprises a hot-pressing step comprising applying pressures of from 2 to 5 GPa to said compact and raising the temperature of said compact to from 100° to 500° C.

14. The compact of claim 13, wherein the hardness of said compact is at least 1200 kg/mm$^2$.

15. The compact of claim 11, wherein said process further comprises a sintering step comprising increasing the temperature of said compact to from 1000° to 1500° C.

16. The compact of claim 15, wherein the hardness of said compact is at least 2000 kg/mm$^2$.

17. The compact of claim 16, wherein said sintered compact has an optical transparency of from 20.0 to 0.1 mm$^{-1}$.

18. The compact of claim 11, wherein the starting powder is selected from the group consisting of ceramics, metals and mixtures thereof.

19. The compact of claim 11, wherein the starting powder is silicon nitride.

* * * * *